US009367923B2

(12) United States Patent
Nanbu et al.

(10) Patent No.: US 9,367,923 B2
(45) Date of Patent: Jun. 14, 2016

(54) IMAGE PROCESSING APPARATUS WITH IMPROVED COMPRESSION OF IMAGE DATA OF CHARACTER IMAGES AND BACKGROUND IMAGES USING RESPECTIVE DIFFERENT COMPRESSING METHODS

(71) Applicant: KYOCERA Document Solutions Inc.

(72) Inventors: Sota Nanbu, Osaka (JP); Masaki Baba, Osaka (JP)

(73) Assignee: Kyocera Document Solutions, Inc. (JP)

( * ) Notice: Subject to any disclaimer, the term of this patent is extended or adjusted under 35 U.S.C. 154(b) by 4 days.

(21) Appl. No.: 14/315,751

(22) Filed: Jun. 26, 2014

(65) Prior Publication Data

US 2015/0003728 A1 Jan. 1, 2015

(30) Foreign Application Priority Data

Jun. 28, 2013 (JP) .................................. 2013-137071
Oct. 31, 2013 (JP) .................................. 2013-226599

(51) Int. Cl.
*G06K 9/00* (2006.01)
*G06T 7/00* (2006.01)
*H04N 1/409* (2006.01)

(52) U.S. Cl.
CPC ............ *G06T 7/0083* (2013.01); *H04N 1/4092* (2013.01); *G06T 2207/20136* (2013.01); *G06T 2207/20144* (2013.01)

(58) Field of Classification Search
None
See application file for complete search history.

(56) References Cited

U.S. PATENT DOCUMENTS

| | | | |
|---|---|---|---|
| 2002/0037100 A1* | 3/2002 | Toda et al. ..................... | 382/166 |
| 2005/0018766 A1* | 1/2005 | Iwamura .................. | 375/240.01 |
| 2008/0137148 A1* | 6/2008 | Oh et al. ....................... | 358/3.23 |
| 2014/0146072 A1* | 5/2014 | Mutsuo et al. ................ | 345/589 |
| 2014/0147036 A1* | 5/2014 | Mutsuo et al. ................ | 382/164 |
| 2014/0147038 A1* | 5/2014 | Mutsuo et al. ................ | 382/165 |
| 2014/0177958 A1* | 6/2014 | Mutsuo et al. ................ | 382/166 |

FOREIGN PATENT DOCUMENTS

JP 2007-336000 12/2007

* cited by examiner

*Primary Examiner* — Feng Niu

(57) ABSTRACT

An edge image generating unit detects edges in an original image and generates an edge image from the edges. A connection pixel extracting unit extracts connection pixel sets in the edge image. A binary image generating unit classifies colors of the connection pixel sets into a predetermined number of achromatic target colors and a predetermined number of chromatic target colors if a color mode is set as color, and classifies the colors of the connection pixel sets into a predetermined number of achromatic target colors if the color mode is set as monochrome, where the number of the achromatic target colors set in the color mode of monochrome is larger than the number of the achromatic target colors in the color mode of color.

6 Claims, 6 Drawing Sheets

FIG. 2

|  | R | G | B | Y | Cb | Cr |
|---|---|---|---|---|---|---|
| MONOCHROME | 0 | 0 | 0 | 0 | 128 | 128 |
|  | 128 | 128 | 128 | 128 | 128 | 128 |
|  | 255 | 255 | 255 | 255 | 128 | 128 |
| COLOR | 255 | 0 | 0 | 77 | 85 | 255 |
|  | 255 | 128 | 0 | 152 | 43 | 202 |
|  | 255 | 255 | 0 | 226 | 1 | 149 |
|  | 128 | 255 | 0 | 188 | 22 | 85 |
|  | 0 | 255 | 0 | 149 | 43 | 21 |
|  | 0 | 255 | 128 | 164 | 107 | 11 |
|  | 0 | 255 | 255 | 178 | 171 | 1 |
|  | 0 | 128 | 255 | 104 | 213 | 54 |
|  | 0 | 0 | 255 | 29 | 255 | 107 |
|  | 128 | 0 | 255 | 67 | 234 | 171 |
|  | 255 | 0 | 255 | 106 | 213 | 235 |
|  | 255 | 0 | 128 | 91 | 149 | 245 |
|  | 128 | 0 | 0 | 39 | 107 | 192 |
|  | 128 | 128 | 0 | 114 | 64 | 139 |
|  | 0 | 128 | 0 | 75 | 86 | 75 |
|  | 0 | 128 | 128 | 90 | 150 | 64 |
|  | 0 | 0 | 128 | 15 | 192 | 118 |
|  | 128 | 0 | 128 | 53 | 171 | 182 |
|  | 255 | 127 | 127 | 166 | 107 | 192 |
|  | 255 | 255 | 127 | 241 | 64 | 139 |
|  | 127 | 255 | 127 | 202 | 86 | 75 |
|  | 127 | 255 | 255 | 217 | 150 | 64 |
|  | 127 | 127 | 255 | 142 | 192 | 118 |
|  | 255 | 127 | 255 | 180 | 171 | 182 |

FIG. 3

| | R | G | B | Y | Cb | Cr |
|---|---|---|---|---|---|---|
| MONOCHROME | 0 | 0 | 0 | 0 | 128 | 128 |
| | 64 | 64 | 64 | 64 | 128 | 128 |
| | 128 | 128 | 128 | 128 | 128 | 128 |
| | 192 | 192 | 192 | 192 | 128 | 128 |
| | 255 | 255 | 255 | 255 | 128 | 128 |

FIG. 4

| CLASS | INITIAL VALUES OF TARGET COLORS | | |
|---|---|---|---|
| | Y | U | V |
| BLACK | 0x00 | 0x80 | 0x80 |
| GRAY #1 | 0x55 | 0x80 | 0x80 |
| GRAY #2 | 0xAA | 0x80 | 0x80 |
| WHITE | 0xFF | 0x80 | 0x80 |

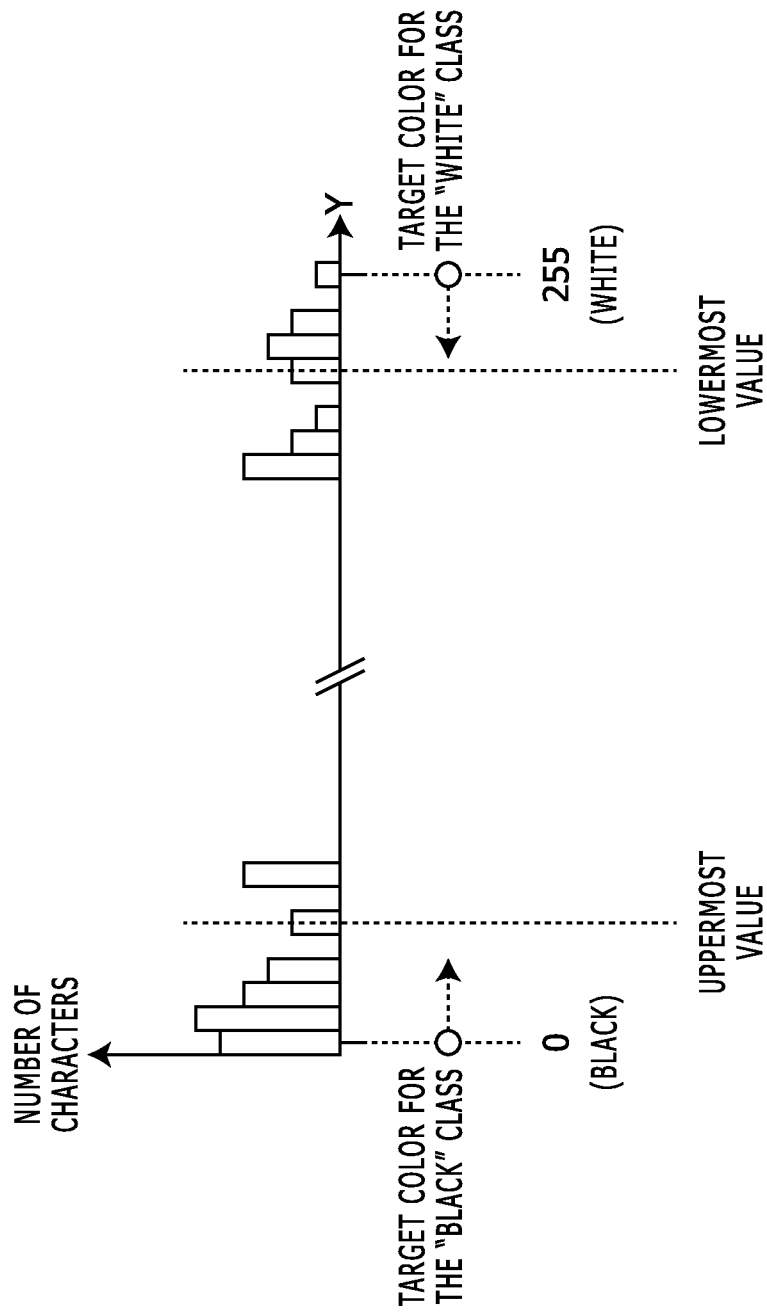

IMAGE PROCESSING APPARATUS WITH IMPROVED COMPRESSION OF IMAGE DATA OF CHARACTER IMAGES AND BACKGROUND IMAGES USING RESPECTIVE DIFFERENT COMPRESSING METHODS

CROSS-REFERENCE TO RELATED APPLICATIONS

This application relates to and claims priority rights from Japanese Patent Application No. 2013-137071, filed on Jun. 28, 2013 and Japanese Patent Application No. 2013-226599, filed on Oct. 31, 2013, the entire disclosures of which are hereby incorporated by reference herein.

BACKGROUND

1. Field of the Present Disclosure

The present disclosure relates to an image processing apparatus.

2. Description of the Related Art

An image processing apparatus finds character blocks in an image, determines respective representative colors of the character blocks, unifies plural character blocks between which the representative color difference and the distance are small, and consequently reduces a file size of a highly compressed PDF (Portable Document Format).

However, the aforementioned technique unifies only character blocks between which the representative color difference and the distance are small, and consequently leaves a lot of character blocks (i.e. a lot of character colors). A highly compressed PDF is obtained by independently compressing respective character planes of which the number is the same as the number of the aforementioned character blocks. Therefore, the aforementioned technique does not result in a small file size of the highly compressed PDF. In addition, if a black character or a white character is unified, a black character or a white character is changed to a gray character, and consequently the spoiled image quality is easily perceived.

SUMMARY

An image processing apparatus according to an aspect of the present disclosure includes an edge image generating unit, a connection pixel extracting unit, a binary image generating unit, a background image generating unit, and an image compressing unit. The edge image generating unit is configured to detect edges in an original image and to generate an edge image formed by the detected edges. The connection pixel extracting unit is configured to extract connection pixel sets in the edge image. The binary image generating unit is configured to classify the connection pixel sets into target colors by classifying colors of the connection pixel sets into the target colors and generate character images which are binary images corresponding to the target colors. Each one of the character images is generated on the basis of the connection pixel sets of which the colors were classified into one of the target colors. The background image generating unit is configured to generate a background image of the original image on the basis of the character images. The image compressing unit is configured to compress image data of the character images and image data of the background image using respective different compressing methods. The binary image generating unit is further configured to classify the colors of the connection pixel sets into a predetermined number of achromatic target colors and a predetermined number of chromatic target colors if a color mode is set as color, and classify the colors of the connection pixel sets into a predetermined number of achromatic target colors if the color mode is set as monochrome. The number of the achromatic target colors set in the color mode of monochrome is larger than the number of the achromatic target colors in the color mode of color.

An image processing apparatus according to an aspect of the present disclosure include an edge image generating unit, a connection pixel extracting unit, a binary image generating unit, a background image generating unit, and an image compressing unit. The edge image generating unit is configured to detect edges in an original image and to generate an edge image formed by the detected edges. The connection pixel extracting unit is configured to extract connection pixel sets in the edge image. The binary image generating unit is configured to classify the connection pixel sets into target colors by classifying colors of the connection pixel sets into the target colors and generate character images which are binary images corresponding to the target colors. Each one of the character images is generated on the basis of the connection pixel sets of which the colors were classified into one of the target colors. The background image generating unit is configured to generate a background image of the original image on the basis of the character images. The image compressing unit is configured to compress image data of the character images and image data of the background image using respective different compressing methods. The binary image generating unit is further configured to classify the colors of the connection pixel sets into a predetermined number of achromatic target colors and a predetermined number of chromatic target colors if at least one of the connection pixel sets in the edge image is color, and classify the colors of the connection pixel sets into a predetermined number of achromatic target colors if all of the connection pixel sets in the edge image are monochrome. The number of the achromatic target colors in case that all of the connection pixel sets in the edge image are monochrome is larger than the number of the achromatic target colors in case that at least one of the connection pixel sets in the edge image is color. The binary image generating unit is further configured to perform a target color renewal process plural times to set the achromatic target colors. The binary image generating unit is further configured so that in the target color renewal process the binary image generating unit (a) classifies colors of the connection pixel sets into classes corresponding to the achromatic target colors, (b) changes an achromatic target color of a class on the basis of the colors of the connection pixel set classified into the class with restricting change of one or more achromatic target colors that belongs to one or both of classes corresponding white and black with a predetermined lowermost value and/or a predetermined uppermost value.

These and other objects, features and advantages of the present disclosure will become more apparent upon reading of the following detailed description along with the accompanied drawings.

BRIEF DESCRIPTION OF THE DRAWINGS

FIG. 2 shows a diagram which indicates an example of achromatic target colors and chromatic target colors in case that the color mode is set as color;

FIG. 3 shows a diagram which indicates an example of achromatic target colors in case that the color mode is set as monochrome;

FIG. 4 shows a diagram which indicates an example of classes and initial values thereof corresponding to achromatic target colors in Embodiment 2;

FIG. 6 shows a diagram which explains a process to determine achromatic target colors in Embodiment 2.

DETAILED DESCRIPTION

Hereinafter, embodiments according to an aspect of the present disclosure will be explained with reference to drawings.

Embodiment 1.

Figure 1:
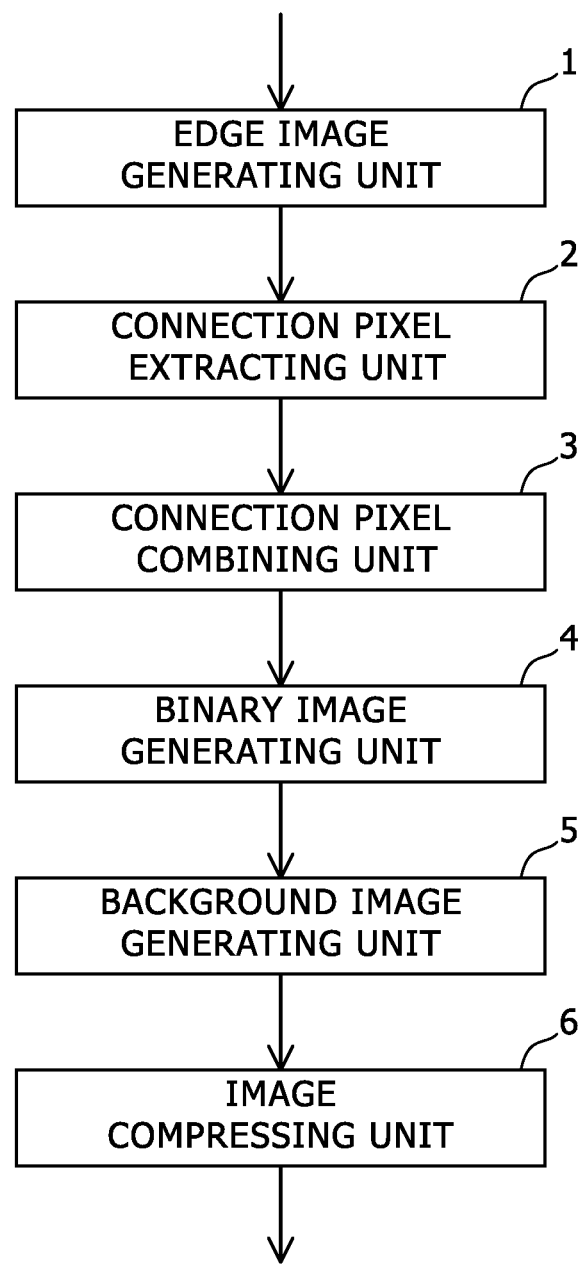
FIG. 1 shows a block diagram which indicates a configuration of an image processing apparatus according to an embodiment of the present disclosure.

FIG. 1 shows a block diagram which indicates a configuration of an image processing apparatus according to an embodiment of the present disclosure. The image processing apparatus shown in FIG. 1 is formed, for example, with an ASIC (Application Specific Integrated Circuit), a computer, and so forth. Image data of sorts of images such as an original image is stored in a RAM (Random Access Memory), a non volatile memory, or the like. Processing units mentioned below are formed using the ASIC and a processor in the computer.

An edge image generating unit 1 detects edges in an original image, and generates an edge image formed by the detected edges. In this embodiment, the edge image is an image which indicates positions of pixels on a high density side of the detected edges, and is a binary image. Therefore, values of the pixels on a high density side of the detected edges are 1, values of the other pixels are 0. In this embodiment, the original image is a gradational color image, and the edge image generating unit 1 generates an image of only a luminance component of the original image, detects edges in the generated image, and generates the edge image formed by the detected edges.

A connection pixel extracting unit 2 extracts a connection pixel set in the edge image, and manages a series of connection pixels so as to enable them to be identified as a set. Therefore, when a connection pixel set and another connection pixel set are not connected, the connection pixel sets are managed so as to enable them to be identified as two different sets. A connection pixel set consists of either a single pixel or plural pixels which are concatenated to each other among the aforementioned pixels on the high density side (i.e. pixels with the pixel value of 1).

A connection pixel combining unit 3 detects the connection pixel sets to which the circumscribed rectangles are close to each other and unifies the detected connection pixel sets as one connection pixel set. For example, connection pixel sets are unified if a predetermined condition is satisfied such as a condition that one of rectangles circumscribed to the connection pixel sets is overlapped to the other in a part or a condition that a distance between rectangles circumscribed to the connection pixel sets is shorter than a predetermined threshold value.

Subsequently, the binary image generating unit 4 classifies the connection pixel sets by classifying colors of the connection pixel sets (i.e. colors in the original image) into predetermined plural target colors, and generates character images corresponding to the respective target colors. The character image is a binary image. Here the character image is generated on the basis of connection pixel sets except for a connection pixel set which does not correspond to a character.

For example, regarding five connection pixel sets A to E, if colors of the connection pixel sets A and B in an original image are classified into a first target color, a color of the connection pixel set C in the original image is classified into a second target color, colors of the connection pixel sets D and E in an original image are classified into a third target color, then for the first target color a character image is generated in which pixel values in positions of the connection pixel sets A and B are 1 and pixel values in the other positions are 0, for the second target color a character image is generated in which pixel values in positions of the connection pixel set C are 1 and pixel values in the other positions are 0, and for the third target color a character image is generated in which pixel values in positions of the connection pixel sets D and E are 1 and pixel values in the other positions are 0.

Further, for example, the binary image generating unit may identify whether the connection pixel set is a character or non character on the basis of a color distribution within the connection pixel set.

Furthermore, if a color mode is set as color, the binary image generating unit 4 classifies the colors of the connection pixel sets into a predetermined number of achromatic target colors and a predetermined number of chromatic target colors. Otherwise, if the color mode is set as monochrome, the binary image generating unit 4 classifies the colors of the connection pixel sets into a predetermined number of achromatic target colors. A larger number of the achromatic target colors in the color mode of monochrome are set than the achromatic target colors in the color mode of color. The color mode is a setting item. If a compressed image is made as a color image (i.e. an image with color information), the setting value "color" is set to the color mode, and if a compressed image is made as a monochrome image (i.e. an image without color information), the setting value "monochrome" is set to the color mode.

Furthermore, if there are only a predetermined number or less of connection pixel sets of which the colors were classified into an original target color and are apart by at least a predetermined amount from an average of the colors classified into the original target color in the achromatic and chromatic target colors (in this embodiment, the colors apart from the average by a predetermined distance in the Y-Cb-Cr color space), the binary image generating unit 4 re-classifies the predetermined number or less of connection pixel sets into another target color.

After re-classifying the one or more connection pixel sets, if there are only a predetermined number or less of connection pixel sets of which the colors were classified into the original target color and are apart by at least a predetermined amount from an average of the colors classified into the original target color except for the re-classified connection pixel set, the binary image generating unit 4 re-classifies the predetermined number or less of connection pixel sets again into another target color. This process is repeatedly performed until no more connection pixel sets to be re-classified into another target color remain in connection pixel sets classified into each target color.

In this embodiment, the number of the achromatic target colors is either equal to or larger than 3 and the achromatic target colors includes the black color value (i.e. [R, G, B]=[0, 0, 0]) and the white color value (i.e. [R, G, B]=[255, 255, 255]). Here the number of the achromatic target colors is 3 in case that the color mode is set as color, and the number of the achromatic target colors is 5 in case that the color mode is set as monochrome. When the color mode is set as monochrome, it is considered that the color irregularity due to a large number of pixels having achromatic colors in the color mode of monochrome tends to be larger than that in the color mode of color. Therefore, a larger number of the achromatic target colors enables to classify each connection pixel set into a closer color to the original image. Consequently, it results in small image quality deterioration due to compression on an achromatic character.

FIG. 2 shows a diagram which indicates an example of achromatic target colors and chromatic target colors in case that the color mode is set as color. In FIG. 2, three colors of "MONOCHROME" are achromatic target colors, and 24 colors of "COLOR" are chromatic target colors. The achromatic target colors are set so as to have the luminance thereof with a constant interval, and the chromatic target colors are set so as to have each one of the R, G, B values thereof with any of 0, 127, 128, and 255 in the RGB color space.

FIG. 3 shows a diagram which indicates an example of achromatic target colors in case that the color mode is set as monochrome. In FIG. 3, five colors of "MONOCHROME" are achromatic target colors.

The binary image generating unit 4 converts the colors of the connection pixel sets from the RGB color space to the Y-Cb-Cr color space. If the color mode is set as color, the binary image generating unit 4 classifies the converted color in the Y-Cb-Cr color space into a target color closest to the converted color among the achromatic target colors and the chromatic target colors shown in FIG. 2. If the color mode is set as monochrome, the binary image generating unit 4 classifies the converted color into a target color closest to the converted color among the achromatic target colors shown in FIG. 3.

A background image generating unit 5 generates a background image of the original image on the basis of the aforementioned character images. Specifically, the background image generating unit 5 identifies positions of characters in the aforementioned character image (i.e. pixel positions on which pixel values are 1) on the basis of the character image, and generates a background image by changing pixel values of original image on the identified positions in the following manner.

An image compressing unit 6 compresses image data of the aforementioned character images and image data of the background image using respective different compressing methods. For example, image data of the character image is compressed using MMR (Modified Modified READ) method, and image data of the background image is compressed using JPEG (Joint Photographic Experts Group) method. It should be noted that there are pieces of data of which the number is same as the number of the colors, and respective ones of the pieces of data are compressed. Further, a value of each color is managed so as to be related to compressed image data of that color.

The following part explains a behavior of the aforementioned image processing apparatus.

Firstly, the edge image generating unit 1 detects edges in an original image and generates an edge image formed by the detected edges.

Subsequently, the connection pixel extracting unit 2 extracts a connection pixel set in the edge image, and manages a series of connection pixels so as to enable them to be identified as one set.

The connection pixel combining unit 3 identifies positions and sizes of respective rectangles circumscribed to the connection pixel sets extracted by the connection pixel extracting unit 2, detects the connection pixel sets to which the circumscribed rectangles are close to each other and combines the detected connection pixel sets into one connection pixel set if the circumscribed rectangles are close to each other.

Subsequently, the binary image generating unit 4 classifies the colors of the connection pixel sets into the target colors corresponding to the color mode, and generates character images corresponding to the respective target colors that at least one of the connection pixel sets was classified into.

Further, as mentioned, for each one of the original target colors that at least one of the connection pixel sets was classified into, the binary image generating unit 4 identifies whether there are only a predetermined number or less of connection pixel sets of which the colors were classified into the original target color and are apart by at least a predetermined amount from an average of the colors classified into the original target color. If there are only a predetermined number or less of such connection pixel sets, then the binary image generating unit 4 re-classifies such connection pixel sets into another target color.

Afterward, for the original target color that the connection pixel set re-classified into another target color had been classified into, the binary image generating unit 4 repeatedly performs the same process after excluding the connection pixel set re-classified into another target color until no more connection pixel sets to be re-classified into another target color remain.

Subsequently, the background image generating unit 5 generates a background image of the original image on the basis of the aforementioned character images.

The image compressing unit 6 compresses image data of the aforementioned character images and image data of the background image using respective different compressing methods.

In the aforementioned manner, character images and a background image are separated from an original image and are compressed separately.

As mentioned, in the aforementioned Embodiment 1, the connection pixel extracting unit 2 extracts a connection pixel set in an edge image obtained from an original image, the binary image generating unit 4 classifies the connection pixel sets by classifying colors of the connection pixel sets into predetermined plural target colors, and generates character images corresponding to the respective target colors, and the image compressing unit 6 compresses image data of the character images and image data of the background image using respective different compressing methods. Further, the binary image generating unit 4 classifies the colors of the connection pixel sets into a predetermined number of achromatic target colors and a predetermined number of chromatic target colors if the color mode is set as color, and classifies the colors of the connection pixel sets into a predetermined number of achromatic target colors if the color mode is set as monochrome. A larger number of the achromatic target colors in the color mode of monochrome are set than the achromatic target colors in the color mode of color.

Consequently, image quality deterioration due to compression is small on an achromatic character.

Further, if a highly compressed PDF file is generated using the aforementioned compressed data, the generated highly compressed PDF file has a small file size. Consequently, this highly compressed PDF file is opened and an image based on the highly compressed PDF file is displayed in a short time.

Embodiment 2.

In Embodiment 2, the aforementioned achromatic target colors are set in accordance with a distribution of character colors in an image to be compressed. In Embodiment 1, the binary image generating unit 4 uses different numbers of achromatic target colors in the color mode of color and monochrome, respectively. Contrarily, in Embodiment 2, regardless of the color mode, the binary image generating unit 4 classifies colors of connection pixel sets into a predetermined number of achromatic target colors and a predetermined number of chromatic target colors if at least one of the connection pixel sets is color, and colors of connection pixel sets into a predetermined number of achromatic target colors if all of the connection pixel sets are monochrome. A larger number of the achromatic target colors in case that all of the connection pixel sets in the edge image are monochrome are set than the achromatic target colors in case that at least one of the connection pixel sets in the edge image is color. For example, if all of the connection pixel sets in the edge image are monochrome, the target colors shown in FIG. 3 are used, and if at least one of the connection pixel sets in the edge image is color, the target colors shown in FIG. 2 are used.

In Embodiment 2, the binary image generating unit 4 performs a target color renewal process plural times to set the achromatic target colors. In the target color renewal process, the binary image generating unit 4 (a) classifies colors of the connection pixel sets into classes corresponding to the achromatic target colors, (b) renews an achromatic target color of a class on the basis of the colors of the connection pixel set classified into the class with restricting change of one or more achromatic target colors that belongs to one or both of classes corresponding white and black (i.e. classes corresponding to achromatic target colors having the largest and the lowest luminance values) with a predetermined lowermost value and/or a predetermined uppermost value.

Specifically, in the target color renewal process, the binary image generating unit 4 sets a center value between a largest value and a smallest value in the colors of the connection pixel values classified in each class as a target color candidate of the class; (b1) for classes other than one or both classes of the achromatic target colors corresponding to white and black, renews the achromatic target value with the target color candidate; (b2) for the class of the achromatic target color corresponding to white, renews the achromatic target value with the target color candidate if the target color candidate is either equal to or larger than the lowermost value, and renews the achromatic target value with the lowermost value if the target color candidate is less than the lowermost value; and (b3) for the class of the achromatic target color corresponding to black, renews the achromatic target value with the target color candidate if the target color candidate is either equal to or less than the uppermost value, and renews the achromatic target value with the uppermost value if the target color candidate is larger than the uppermost value.

FIG. 4 shows a diagram which indicates an example of classes and initial values thereof corresponding to achromatic target colors in Embodiment 2.

In Embodiment 2, for example, as shown in FIG. 4, for four classes "BLACK", "GRAY #1", "GRAY #2", and "WHITE" corresponding to four achromatic target colors in case that the color mode is set as monochrome, respective initial values are set to the achromatic target colors.

Figure 5:
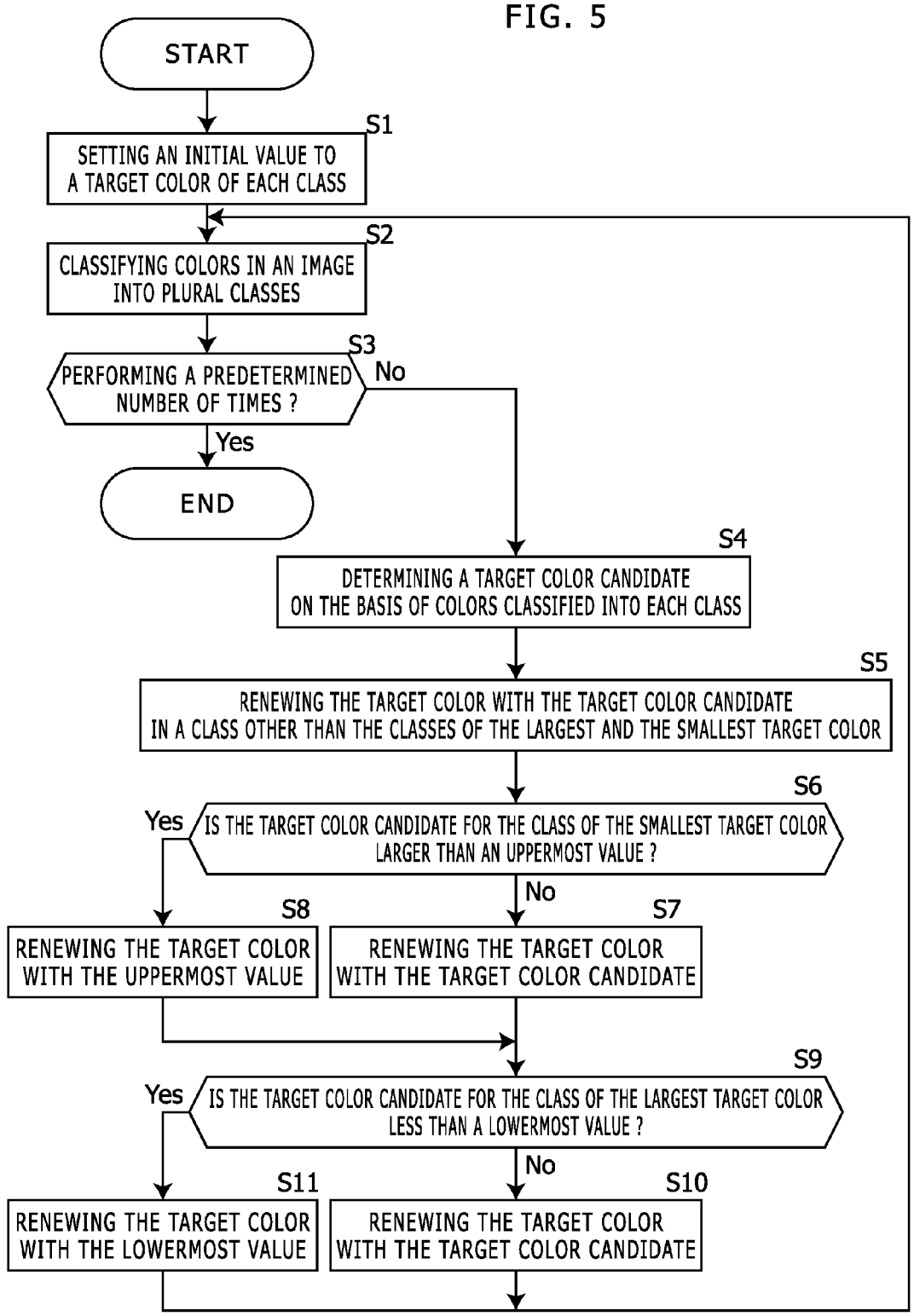
FIG. 5 shows a flowchart which explains a process to determine achromatic target colors in Embodiment 2.

The following part explains a process to set achromatic target colors in Embodiment 2. FIG. 5 shows a flowchart which explains a process to determine achromatic target colors in Embodiment 2. FIG. 6 shows a diagram which explains a process to determine achromatic target colors in Embodiment 2.

Firstly, the binary image generating unit 4 sets initial values to the achromatic target colors of respective classes (in Step S1).

Subsequently, the binary image generating unit 4 classifies colors of connection pixel sets in the image into the plural classes (i.e. the plural achromatic target colors) (in Step S2). Each one of the colors of the connection pixel sets is classified into the class of the closest achromatic target color (i.e. the achromatic target color having the closest luminance value Y) in the current achromatic target colors.

Subsequently, the binary image generating unit 4 identifies whether the target color renewal process (i.e. Steps S4 to S11) has been performed predetermined times (in Step S3). The binary image generating unit 4 performs the target color renewal process predetermined times, and for classifying colors of the connection pixel sets, the binary image generating unit 4 uses the achromatic target colors obtained when finishing the predetermined times of the target color renewal process.

In the target color renewal process, the binary image generating unit 4 sets a center value between the largest value and the smallest value in the colors of the connection pixel values classified in each class as a target color candidate of the class (in Step S4).

The binary image generating unit 4 renews the achromatic target value with the target color candidate for classes other than one or both classes of the achromatic target colors corresponding to white and black (e.g. GRAY #1 and GRAY #2 in FIG. 4) (in Step S5).

Further, the binary image generating unit 4 identifies whether the target color candidate for the class of the achromatic target color corresponding to black is either equal to or less than the uppermost value (in Step S6). If the target color candidate for the class of the achromatic target colors corresponding to black is either equal to or less than the uppermost value, then the binary image generating unit 4 renews the achromatic target color of this class with the target color candidate (in Step S7), and otherwise renews the achromatic target color of this class with the uppermost value (in Step S8).

Furthermore, the binary image generating unit 4 identifies whether the target color candidate for the class of the achromatic target color corresponding to white is either equal to or larger than the lowermost value (in Step S9). If the target color candidate for the class of the achromatic target colors corresponding to white is either equal to or larger than the lowermost value, then the binary image generating unit 4 renews the achromatic target color of this class with the target color candidate (in Step S10), and otherwise renews the achromatic target color of this class with the lowermost value (in Step S11).

After performing the target color renewal process in the aforementioned manner, the binary image generating unit 4 re-classifies the colors of the connection pixel sets in the image into the plural classes (i.e. the plural achromatic target colors).

Other parts of the configuration and behaviors of the image processing apparatus in Embodiment 2 are identical to those in Embodiment 1, and therefore, are not explained here.

As mentioned, in the aforementioned Embodiment 2, as shown in FIG. 6, the achromatic target color corresponding to white is prevented from being less than the lowermost value and/or the achromatic target color corresponding to black is prevented from being larger than the uppermost value in the target color renewal process performed to set achromatic target colors.

Consequently, when favorable achromatic target colors are selected for character colors in the image, a large color change does not occur on a white character and/or a black character in the image. In general, a color change that occurs on white character and black character is visually easily perceived, and therefore the aforementioned manner is used for low image quality deterioration due to compression.

The description has been presented for purposes of illustration and description, and is not intended to be exhaustive or limited.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
an edge image generating unit configured to detect edges in an original image and to generate an edge image formed by the detected edges;
a connection pixel extracting unit configured to extract connection pixel sets in the edge image;
a binary image generating unit configured to classify the connection pixel sets into target colors by classifying colors of the connection pixel sets into the target colors and generate character images which are binary images corresponding to the target colors, each one of the character images generated on the basis of the connection pixel sets of which the colors were classified into one of the target colors;
a background image generating unit configured to generate a background image of the original image on the basis of the character images; and
an image compressing unit configured to compress image data of the character images and image data of the background image using respective different compressing methods;
wherein the binary image generating unit is further configured to classify the colors of the connection pixel sets into a predetermined number of achromatic target colors and a predetermined number of chromatic target colors if a color mode is set as color, and classify the colors of the connection pixel sets into a predetermined number of achromatic target colors if the color mode is set as monochrome;
the number of the achromatic target colors set in the color mode of monochrome is larger than the number of the achromatic target colors in the color mode of color; and
wherein the binary image generating unit is further configured so that if there are only a predetermined number or less of connection pixel sets of which the colors were classified into an original target color in the achromatic target colors and the chromatic target colors and are apart by at least a predetermined amount from an average of the colors classified into the original target color, the binary image generating unit re-classifies the predetermined number or less of the connection pixel sets into another target color.

2. The image processing apparatus according to claim 1, wherein the binary image generating unit is further configured so that after the re-classifying, if there are only a predetermined number or less of connection pixel sets of which the colors were classified into the original target color and are apart by at least a predetermined amount from an average of the colors classified into the original target color except for the one or more re-classified connection pixel set, the binary image generating unit re-classifies the predetermined number or less of connection pixel sets into another target color.

3. The image processing apparatus according to claim 1, wherein the binary image generating unit is further configured so that if there are only a predetermined number or less of connection pixel sets of which the colors were classified into the original target color and are apart by at least a predetermined amount from an average of the colors classified into the original target color in the Y-Cb-Cr color space, the binary image generating unit re-classifies the predetermined number or less of connection pixel sets into another target color.

4. The image processing apparatus according to claim 1, wherein the number of the achromatic target colors set in the color mode of monochrome is either equal to or larger than 3, and the achromatic target colors include a black color value and a white color value.

5. An image processing apparatus, comprising:
an edge image generating unit configured to detect edges in an original image and to generate an edge image formed by the detected edges;
a connection pixel extracting unit configured to extract connection pixel sets in the edge image;
a binary image generating unit configured to classify the connection pixel sets into target colors by classifying colors of the connection pixel sets into the target colors and generate character images which are binary images corresponding to the target colors, each one of the character images generated on the basis of the connection pixel sets of which the colors were classified into one of the target colors;
a background image generating unit configured to generate a background image of the original image on the basis of the character images; and
an image compressing unit configured to compress image data of the character images and image data of the background image using respective different compressing methods;
wherein the binary image generating unit is further configured to classify the colors of the connection pixel sets into a predetermined number of achromatic target colors and a predetermined number of chromatic target colors if at least one of the connection pixel sets in the edge image is color, and classify the colors of the connection pixel sets into a predetermined number of achromatic target colors if all of the connection pixel sets in the edge image are monochrome;
the number of the achromatic target colors in case that all of the connection pixel sets in the edge image are monochrome is larger than the number of the achromatic target colors in case that at least one of the connection pixel sets in the edge image is color;
the binary image generating unit is further configured to perform a target color renewal process plural times to set the achromatic target colors; and
the binary image generating unit is further configured so that in the target color renewal process the binary image generating unit (a) classifies colors of the connection pixel sets into classes corresponding to the achromatic target colors, (b) renews an achromatic target color of a class on the basis of the colors of the connection pixel set classified into the class with restricting change of one or more achromatic target colors that belongs to one or both of classes corresponding white and black with a predetermined lowermost value and/or a predetermined uppermost value.

6. The image processing apparatus according to claim 5, wherein the binary image generating unit is further configured so that in the target color renewal process the binary image generating unit sets a center value between a largest value and a smallest value in the colors of the connection pixel values classified in each class as a target color candidate of the class; (b1) for classes other than one or both classes of the achromatic target colors corresponding to white and black, renews the achromatic target value with the target color candidate; (b2) for the class of the achromatic target colors corresponding to white, renews the achromatic target value with the target color candidate if the target color candidate is either equal to or larger than the lowermost value, and renews the achromatic target value with the lowermost value if the target color candidate is less than the lowermost value; and (b3) for the class of the achromatic target colors corresponding to black, renews the achromatic target value with the target color candidate if the target color candidate is either equal to or less than the uppermost value, and renews the achromatic target value with the uppermost value if the target color candidate is larger than the uppermost value.

* * * * *